Figure 1:
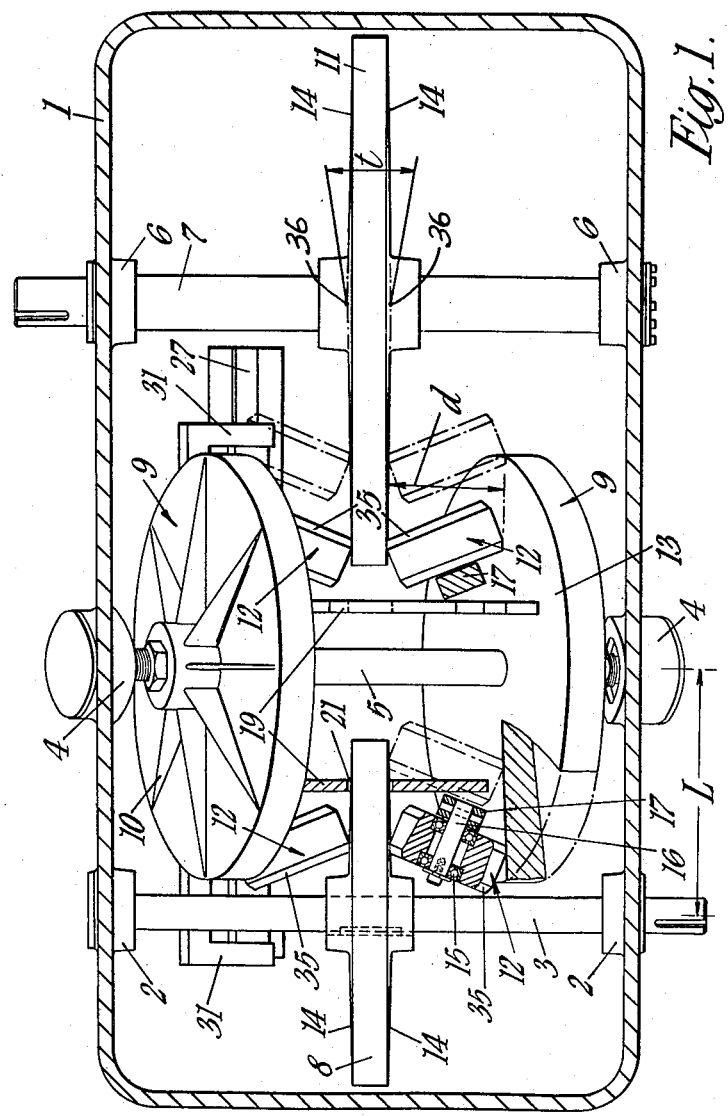

3,115,044
FRICTION DRIVEN STEPLESSLY VARIABLE
SPEED GEARING
William Robinson Andrews, 19 Midgley Road,
Burley-in-Wharfedale, England
Filed Mar. 29, 1961, Ser. No. 99,288
Claims priority, application Great Britain Apr. 8, 1960
14 Claims. (Cl. 74—200)

This invention relates to friction driven steplessly variable speed gearing of the kind which includes at least two friction discs secured in fixed spaced relation on a shaft, a friction disc or discs located between said spaced discs in overlapping and inclined relation thereto, and a motion transmitting member such as a roller or ball disposed in each of the V formations afforded by the relatively inclined discs, the arrangement being such that relative displacement between the motion transmitting members and the discs engaged thereby effects a change in the gear ratio. An example of gearing of the above kind is described in U.S. Patent No. 2,860,518 and in the latter construction the disc faces which engage the balls are flat so that when changing the gear ratio the balls are displaced in planes parallel to the disc faces with which they are in contact. Experience with such arrangements has shown that in certain positions the balls have a tendency to move in a direction either to increase or to decrease the gear ratio, and since the balls are subject to lateral restraint in their direction of displacement, such tendency results in slip between the balls and the discs, this slip being in addition to the slight slippage caused by the relative displacement of the balls when changing the gear ratio. It is accordingly one of the objects of the present invention to reduce or eliminate such undesirable slip and thereby to improve the operation of the gearing.

A further object of the invention is to provide improved means for effecting the necessary relative displacement between the motion transmitting members and the discs for gear changing purposes and thereby to afford an arrangement which is particularly suitable for automatic gear changing.

The invention may be applied to gearing in which ratio changing is effected by displacing a carriage for the motion transmitting members as described in U.S. Patent No. 2,860,518 or alternatively the required relative displacement may be effected by other means.

The invention consists in friction driven steplessly variable speed gearing including at least two friction discs secured in fixed spaced relation on a shaft, at least one friction disc located between said spaced discs in overlapping and inclined relation thereto affording V formations between the relatively inclined discs, and a rotatable motion transmitting member disposed in each of said V formations, in which the faces of the friction discs are so formed that in changing the gear ratio the motion transmitting members engaging opposite faces of a disc located between the rigidly spaced discs are moved in a plane which is inclined to a plane perpendicular to the disc shaft and also intersects the centre of a hypothetical motion transmitting member positioned at the centre of the disc face, and including means for maintaining the members during their traverse motion in a neutral position such that they have no inherent tendency to move either to increase or to decrease the gear ratio.

The invention also consists in gearing according to the preceding paragraph in which the planes of movement of the motion transmitting members are inclined to a plane perpendicular to the disc shaft at an angle which is half the angle between the inclined disc shafts.

The invention also consists in gearing according to either of the preceding paragraphs in which the friction disc faces are formed as shallow cones such that the distance between them remains constant along the planes of movement of the motion transmitting members.

The invention also consists in gearing according to any of the three preceding paragraphs in which the means for maintaining the motion transmitting members in neutral position comprises relatively inclined cam surfaces having their apices on opposite sides of the centre of the shaft carrying the rigidly spaced discs. In a preferred construction, the slope of these cam surfaces relative to a plane perpendicular to the intermediate disc shaft is determined by the formula $$\frac{(d+t) \sec \frac{\theta}{2}}{L}$$

where $d$ is the effective diameter of the motion transmitting members, $t$ is the axial spacing between the hypothetical apices of the coned disc faces if continued to the centre of the disc shaft, $\theta$ is the angle between the relatively inclined shafts, and L is the distance between parallel planes containing the axes of the said relatively inclined shafts. In a preferred arrangement the motion transmitting members are mounted in a carrier forming part of a displaceable carriage arranged so that movement of the latter displaces the said members relatively to the spaced disc shaft and the cam surfaces maintain the members at the correct distances from said shaft during their traverse.

In a construction in which there are two intermediate friction discs arranged on opposite sides of the spaced disc shaft, the two rigidly spaced discs are coned inwardly towards the centres thereof, and the intermediate discs are coned outwardly towards their centres.

Figure 2:
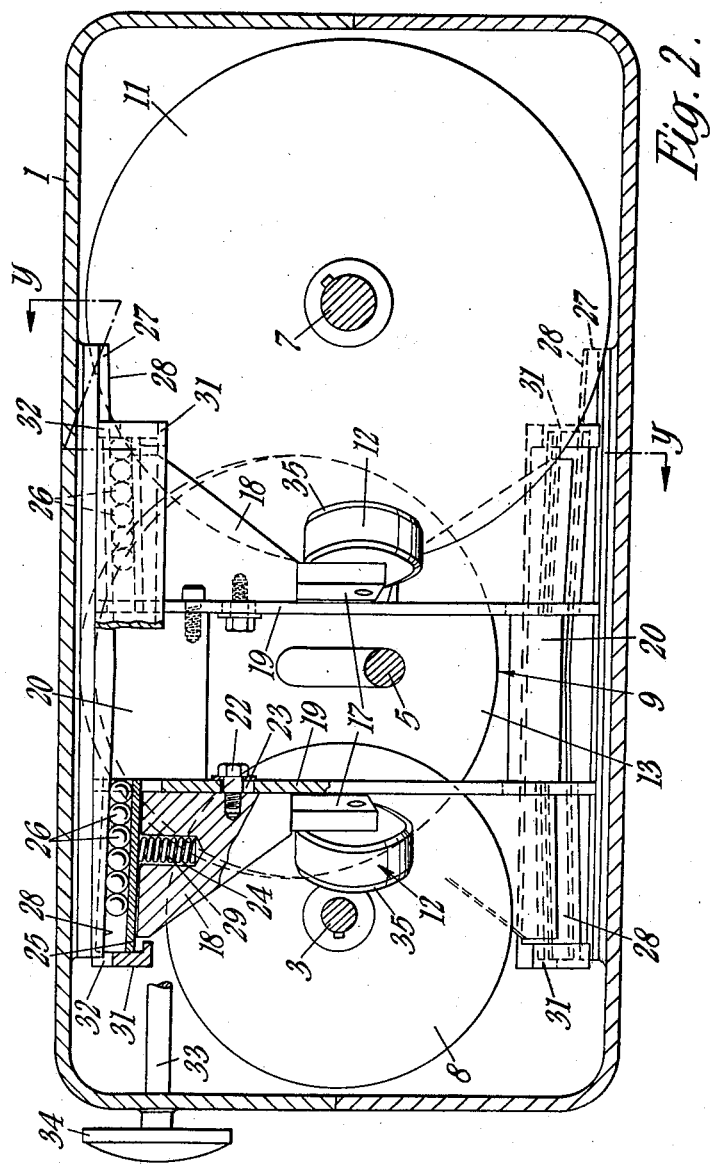
Figure 3:
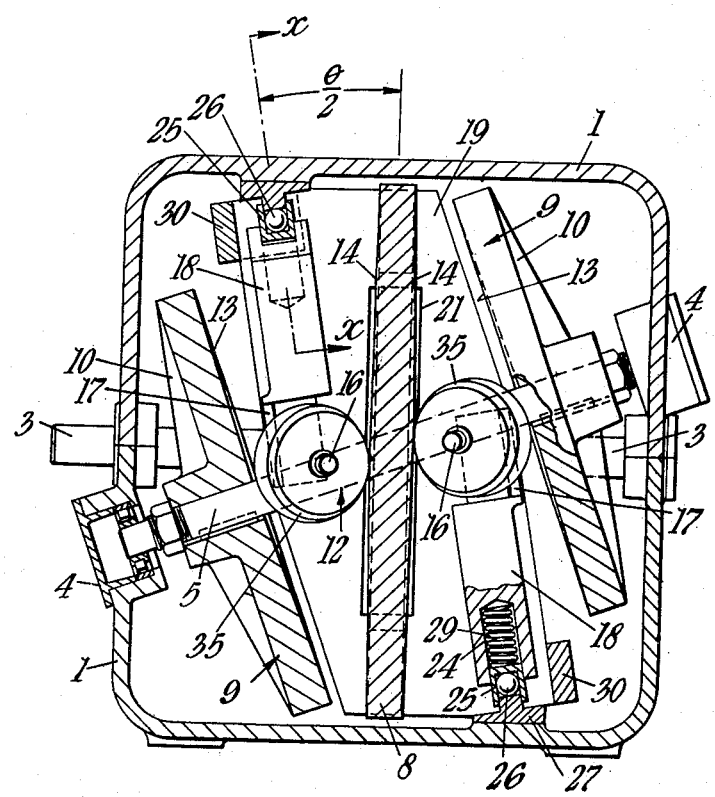

In the accompanying drawings:
FIGURE 1 is a plan view, partly in section and with certain parts omitted, of a friction driven steplessly variable speed gearing constructed in accordance with one form of the invention;
FIGURE 2 is a side elevation of FIGURE 1 with one of the rigidly spaced discs omitted and including a section on the line x—x of FIGURE 3;
FIGURE 3 is a composite section on the line y—y of FIGURE 2 with the output shaft omitted.

In carrying the invention into effect according to one convenient mode, reference being made to FIGURES 1, 2 and 3 of the drawings, there is provided a casing 1 having bearings 2 for an input shaft 3, bearings 4 for a centre shaft 5, and bearings 6 for an output shaft 7. An intermediate friction disc 8 is secured to the input shaft 3. Two friction discs 9 are secured in rigidly spaced relation upon the centre shaft 5 and the outer faces of these discs have radial reinforcing ribs 10. An intermediate friction disc 11 is secured to the output shaft 7, the arrangement being such that the two intermediate friction discs 8 and 11 lie in the same plane and extend between the rigidly spaced discs 9 to overlap these discs. The input and output shafts 3 and 7 are parallel and lie in the same plane, and the centre shaft 5 is inclined as seen in FIGURE 3 so as to afford V formations between the inner faces of the two discs 9 and the opposite faces of the intermediate discs 8 and 11 on the input and output shafts respectively. The illustrated inclination of the shaft 5 is exaggerated as later explained. A motion transmitting roller 12 is disposed in each of the aforesaid V formations so that rotary motion can be transmitted from the disc 8 to the discs 9, and from the latter to the disc 11. Also relative motion between the rollers and the discs engaged thereby in a direction to change the distances between the respective pairs of rollers and the centres of the discs engaged thereby effects a stepless change in the gear ratio. The internal faces 13 of the rigidly spaced discs 9 have the form of shallow cones extending inwardly towards the shaft axis as shown in FIGURE 3. Also the opposite faces 14 of the intermediate discs 8 and 11 have the form of shallow cones which taper outwardly towards their peripheries. Each of the rollers 12 is rotatably mounted by means of a ball bearing 15 upon a spindle 16 secured to a bracket plate 17 forming part of a carrier 18 of plate-like and generally triangular shape. There are four carriers 18, one for each of the four rollers. Each carrier is slidably mounted on a carriage comprising parallel side plates 19 connected by spacing members 20, the side plates 19 being slotted as seen at 21 in FIGURE 1 to admit the intermediate friction discs 8 and 11. The slidable mounting of the carriers 18 referred to above is effected by a bolt 22 secured to the carrier and extending through a slot 23 in the side plate 19. A slot 24 in the outer end of each carrier 18 receives a rectangular channel shaped slide 25 containing a series of bearing balls 26. The open end of each of the slides 25 extends over and is guided by a cam member 27. There are two of these cam members 27 as seen in FIGURE 2, and they are secured respectively to the top and bottom of the casing 1. Each cam member 27 has two relatively inclined cam faces 28 with the central apex of the two faces either vertically above or vertically below the axis of the shaft 5 carrying the rigidly spaced friction discs 9. The bearing balls 26 engage the cam faces 28, and loading springs 29 (see FIGURE 3) are provided to press each of the carriers 18 outwardly so that the rollers 12 are pressed into the V formations afforded by the friction discs.

Carriage guide members 30 are attached to the carriage plates 19 at the top and bottom thereof and have inwardly angled ends 31 each of which is formed with a slot 32 (FIGURE 2) which engages over the rectangular cross section of the cams 27 so as to guide the carriage in a rectilinear path between the input and output shafts 3 and 7 and in a direction perpendicular to the axes of the said shafts. Such movement of the carriage is effected by means of a speed control spindle 33 (FIGURE 2) rotatably mounted in the casing 1 so as to prevent axial movement, and having a hand control disc 34. The inner end of the spindle 33 (not shown) is provided with a thread engaged in a threaded socket forming part of the carriage structure whereby the carriage can be displaced in a conventional manner. Alternatively a rack and pinion arrangement may be employed for this purpose.

The motion transmitting rollers indicated generally at 12 consist of relatively thick cylindrical discs the peripheral edges of which are chamfered as shown at 35. Gear changing is effected by displacing the carriage structure by rotating the hand disc 34 and thereby traversing the rollers between the discs as shown by the full and broken line positions in FIGURE 1, the extent of the traverse being seen from FIGURE 1. During this motion the left hand rollers shown in FIGURE 1 move inwardly, i.e. away from the input shaft 3 in convergent paths over the coned faces of the friction disc 8, and the right hand rollers move towards the output shaft 7 in convergent paths over the coned faces of the friction disc 11. The effect of the cams 27 acting on the roller carriers is that the rollers 12 are guided during their traversing movement so that they always occupy a neutral position, i.e. one in which there is no inherent tendency for them to move in a direction. The neutral positions of the rollers may be defined as those positions in which the centres of the rollers lie on a line joining the centres of the adjacent shafts in the plane of roller movement. It will be seen from FIGURE 3 that the rollers engaged with opposite faces of the friction disc 11 for example will be moved during gear changing in paths or planes which are inclined to a plane perpendicular to the disc shaft at an angle which is half the angle between the relatively inclined disc shafts. Also it will be seen from FIGURE 1 that in gear changing the rollers 12 are moved in a plane which is inclined to a plane perpendicular to the intermediate disc shaft, which plane intersects the centre of a hypothetical motion transmitting member positioned at the centre of the disc faces, e.g. at either of the points 36 in FIGURE 1.

In the arrangement illustrated the distance L between the input shaft 3 and the shaft 5 is approximately two thirds the distance between the shaft 5 and the output shaft 7; and the plane of the motion transmitting rollers 12 bisects the angle between the discs. In these circumstances the conical taper of the friction discs is determined by the formula $$\frac{\frac{d+t}{2}(1-\cos\theta)}{\sqrt{L^2+\left(\frac{d+t}{2}\right)^2\sin^2\theta}}$$

where $d$ is the effective diameter of the rollers, $t$ is the axial spacing between the hypothetic apices of the coned intermediate disc faces if continued to the centre of the disc shaft, and $\theta$ is the angle between the relatively inclined shafts.

It is to be understood that the invention is not restricted to the above example, and that a gear can be constructed in which the inclined plane in which the motion transmitting members or rollers move does not bisect the angle between the disc faces. In such circumstances the larger angle, i.e. that between the plane of movement of a roller and a disc, must not exceed the maximum working friction angle, and therefore the angle between the discs must be reduced. Thus if 4° is the maximum working friction angle then the maximum allowable angle between the discs is 8°. Thus a compromise in choosing the angle of disc taper will be necessary.

The formation of the slope of the cam faces 28 is determined by the formula $$\frac{(d+t)\sec\frac{\theta}{2}}{L}$$

and this is not affected by the relative distances between the input and output shafts and the rigidly spaced disc shaft.

The necessary relative displacement between the friction discs and the motion transmitting members or rollers can be effected by means other than those described above, as for example by displacing the rigidly spaced disc shaft parallel to itself and relative to the said members. For this purpose the rigidly spaced disc shaft bearings are carried in eccentric mountings which are angularly displaceable simultaneously by interconnecting mechanism. With the discs arranged as previously described, the motion transmitting members are carried in a common frame which is free to move endwise. Assuming that the rigidly spaced disc shaft is horizontal and is displaceable above and below a mean position, then in such position the centre of a motion transmitting member will lie on a line joining the centres of the adjacent shafts in the plane of movement of the member, and the loci of the two points of contact will be parallel lines. The tangents to the paths of contact, taken through the point of contact, are parallel, the tangents being normal to the said parallel lines representing the loci. If the shaft is raised by the eccentric means referred to, the aforesaid neutral line will no longer pass through the centre of the motion transmitting members and the aforesaid tangents are no longer parallel, the result being to incline the mean path of the motion transmitting members to divide the angle between the tangents. This causes the members to move so as to change the gear ratio, and such movement will continue until the spaced disc shaft is returned to its mean position. Lowering of the shaft will cause the members to move so as to change the ratio in the opposite sense. It will be understood that if the direction of drive of such a gear is reversed, the direction of movement of the eccentric bearing mountings must also be reversed for changing the gear ratio in the same sense. Thus in this arrangement the motion transmitting members move automatically towards or away from the rigidly spaced disc shaft when the latter is displaced, their displacement being stopped at the desired ratio position by returning the shaft to its mean position.

In a modification of the gearing of FIGURES 1 to 3, the general arrangement of the discs is the same but the motion transmitting members are displaced for ratio changing by displacing the cam members 27 respectively towards and away from the rigidly spaced disc shaft. Thus if said shaft is considered in end view, there are two pairs of members on each side of the shaft, the members of each pair being located on opposite sides of an intermediate disc. The members are located in guides the positions of which are determined by the cams which provide for inward and outward parallel movement. Each cam member has a rear wedge face resting on a longitudinally displaceable operating wedge, the two operating wedges being interconnected by means including rack and pinion or other gearing so that the operating wedges can be displaced simultaneously in opposite directions, whereby the two cam members which position the motion transmitting members are respectively displaced towards and away from the rigidly spaced disc shaft to afford the desired gear ratio. The cam faces extend transversely with respect to the central shaft (i.e. that carrying the rigidly spaced discs) and are guided for inward and outward parallel movement.

The invention is not restricted to the examples previously described in which there are two intermediate discs which overlap a pair of rigidly spaced discs. Thus for example there may be more than two rigidly spaced discs, each pair of such discs having an intermediate overlapping disc. In one possible construction there are three rigidly spaced discs on two parallel shafts with an input shaft disc between two pairs of such spaced discs, and an output shaft having a disc thereon overlapping between the other pair of spaced discs. Alternatively there may be three shafts carrying any desired number of rigidly spaced discs, the shafts being uniformly disposed about intermediate discs. In another arrangement two (or more) rigidly spaced discs on parallel shafts are in overlapping relation with a pair of spaced discs on an input shaft, one of the discs on each of said parallel shafts lying between the spaced input discs. An output shaft carries a disc disposed between the spaced discs of each of the parallel shafts. In another possible arrangement the input shaft carries a pair of rigidly spaced discs which overlap a pair of intermediate discs on separate shafts having secured thereto slightly skew gears meshing with a central gear on an output shaft. In all the above alternatives the overlapping discs are in driving connection by motion transmitting members. It will be understood that by increasing the number of spaced discs on one shaft and also the number of motion transmitting members the power that can be transmitted is correspondingly increased.

The angle of taper of the disc faces in gearing according to the present invention depends upon the angle between the relatively inclined shafts, the diameter of the motion transmitting members, and the number of discs on each shaft. Thus with four discs on each shaft the taper angle of the outer discs and of the outer faces of the inner discs will be greater than for the inner faces of the inner discs. With a disc arrangement as illustrated the taper angle will be approximately 0.0026" per inch.

Instead of providing backing springs for the motion transmitting members as previously described, the carriers for said members may be formed so that the inherent resilience of the casing provides the desired loading.

It will be understood that the transmission of motion between the discs may be effected by balls instead of by rollers.

I claim:

1. Friction driven steplessly variable speed gearing including at least two friction discs secured in fixed spaced relation on a first shift, a second shaft inclined relatively to the said first shaft and carrying at least one friction disc located between said spaced discs in overlapping and inclined relation thereto affording V formations between the relatively inclined discs, and a rotatable motion transmitting member disposed in each of said V formations, in which the faces of the friction discs are so formed that in changing the gear ratio of the centres of the motion transmitting members engaging opposite faces of a disc located between the rigidly spaced discs are each moved in a plane which is normal to a line dividing the angle between the relatively inclined shafts and said centres are also moved in the said plane along a line which intersects the centres of the said shafts, and including means for maintaining the members during their traverse motion in a neutral position such that they have no inherent tendency to move either to increase or to decrease the gear ratio.

2. Gearing as claimed in claim 1, in which the planes of movement of the motion transmitting members are inclined to a plane perpendicular to the disc shaft at an angle which is half the angle between the relatively inclined disc shafts.

3. Gearing as claimed in claim 1, in which the disc faces which engage the motion transmitting members are formed as shallow cones such that the distance between them remains constant along the planes or paths of movement of said members when changing the gear ratio.

4. Gearing as claimed in claim 1, in which the neutral position of a motion transmitting member is such that its centre lies on a line joining the centres of the adjacent shafts in the plane of movement of the member.

5. Gearing as claimed in claim 1 in which the means for maintaining the motion transmitting members in neutral position comprises cam means each having a relatively inclined flat surface and arranged on opposite sides of the centre of the shaft carrying the rigidly spaced discs, each of said flat surfaces being parallel to the plane of movement of the corresponding member when changing the gear ratio.

6. Gearing as claimed in claim 1, in which the means for maintaining the motion transmitting members in neutral position comprises a cam face having a slope determined by the formula $$\frac{(d+t) \sec \frac{\theta}{2}}{L}$$

where $d$ is the effective diameter of the motion transmitting member, $t$ is the hypothetical axial spacing of the apices of the conical faces of the intermediate disc when extended to the centre of its shaft, $\theta$ is the angle between the relatively inclined shafts, and L is the distance between said shafts.

7. Gearing as claimed in claim 1 in which the motion transmitting members are mounted on carriers slidably mounted on a displaceable carriage arranged for movement relative to the overlapping discs to vary the gear ratio, the carriers being slidably guided on the carriage for movement in a direction transverse to the carriage displacement for maintaining the said members in neutral position.

8. Gearing as claimed in claim 7, in which the carriage is guided by engagement with cam means which also control the transverse movement of the carriers and hence of the motion transmitting members.

9. Gearing as claimed in claim 7, in which the carriers are engaged with cam means by spring loaded members whereby the motion transmitting members are resiliently held in the V formations between the overlapping discs, the carriage being guided by said cam means which also control transverse movement of the carriers and hence of the motion transmitting members.

10. Gearing as claimed in claim 7, in which the carriage is guided by engagement with cam means which also control transverse movement of the carriers, and said carriers are engaged with the cam means by spring loaded members whereby the motion transmitting members are resiliently held in the V formations between the overlapping discs, and in which bearing balls are interposed between the spring loaded members and the surfaces of the cam means.

11. Gearing as claimed in claim 1 in which the motion transmitting members are constituted by rollers mounted on spindle, the said rollers having chamfered or conical surfaces for engagement with the faces of the relatively inclined friction discs.

12. Friction gearing as claimed in claim 1 including at least two rigidly spaced discs on a central shaft, and at least two intermediate discs on shafts disposed on opposite sides of the central shaft.

13. Friction gearing as claimed in claim 1 including a casing in which the shafts carrying the discs are mounted, a carriage for the motion transmitting members rectilinearly slidable in the casing, carriers for the motion transmitting members slidable on the carriage in a direction transverse to the sliding motion of the latter, and cam means disposed on opposite sides of the casing for controlling the motion of the carriers.

14. Friction driven steplessly variable speed gearing including at least two friction discs secured in fixed spaced relation on a first shaft, a second shaft inclined relatively to the said first shaft and carrying at least one friction disc located between said spaced discs in overlapping and inclined relation thereto affording V formations between the relatively inclined discs, and a rotatable motion transmitting member disposed in each of said V formations, in which the faces of the friction discs are so formed that in changing the gear ratio the centres of the motion transmitting members engaging opposite faces of a disc located between the rigidly spaced discs are each moved in a plane which is normal to a line dividing the angle between the relatively inclined shafts and the said centres are also moved in the said plane along a line which intersects the centres of the said shafts.

References Cited in the file of this patent

UNITED STATES PATENTS

| | | |
|---|---|---|
| 568,367 | Osgood | Sept. 29, 1896 |
| 1,655,503 | Knoller | Jan. 10, 1928 |
| 2,132,801 | Perruca | Oct. 11, 1938 |
| 2,659,245 | McLaren | Nov. 17, 1953 |
| 2,860,518 | Andrews | Nov. 18, 1958 |

FOREIGN PATENTS

| | | |
|---|---|---|
| 562,950 | Germany | Oct. 31, 1932 |